United States Patent [19]

Kimura et al.

[11] Patent Number: 5,180,173
[45] Date of Patent: Jan. 19, 1993

[54] SPIRAL GROOVE FACE SEAL

[75] Inventors: Yoshikazu Kimura, Fujisawa; Hideo Teuboi, Tokyo, both of Japan

[73] Assignee: Ebara Corporation, Tokyo, Japan

[21] Appl. No.: 727,272

[22] Filed: Jul. 9, 1991

[30] Foreign Application Priority Data

Jul. 9, 1990 [JP]  Japan ................. 2-72261[U]
Jun. 21, 1991 [JP]  Japan .................. 3-177524

[51] Int. Cl.$^5$ .............................................. F16J 15/34
[52] U.S. Cl. .................................................. 277/96.1
[58] Field of Search ............... 277/81 R, 96, 96.1; 384/112, 118, 123

[56] References Cited

U.S. PATENT DOCUMENTS

| | | |
|---|---|---|
| 3,499,653 | 3/1970 | Gardner . |
| 3,675,935 | 7/1972 | Ludwig et al. ............... 277/96.1 X |
| 3,751,045 | 8/1973 | Lindeboom ................... 277/96.1 X |
| 3,782,737 | 1/1974 | Ludwig et al. . |
| 4,099,729 | 7/1978 | Nylykke . |
| 4,212,475 | 7/1980 | Sedy . |
| 4,421,321 | 12/1983 | Lipschitz ...................... 277/96.1 X |
| 4,972,986 | 11/1990 | Lipschitz ...................... 277/96.1 X |
| 5,039,113 | 8/1991 | Gardner ........................ 277/96.1 X |
| 5,071,141 | 12/1991 | Lai et al. ...................... 277/96.1 X |

FOREIGN PATENT DOCUMENTS

| | | |
|---|---|---|
| 0013678 | 6/1980 | European Pat. Off. . |
| 2222082 | 11/1973 | Fed. Rep. of Germany ..... 277/96.1 |
| 8812629.3 | 8/1990 | Fed. Rep. of Germany . |
| 231269 | 12/1984 | Japan ............................. 277/96.1 |
| 723277 | 3/1980 | U.S.S.R. ........................ 277/96.1 |
| 1032856 | 1/1987 | U.S.S.R. ........................ 277/81 R |
| 1483150 | 5/1989 | U.S.S.R. ........................ 277/96.1 |
| 944360 | 12/1963 | United Kingdom ........... 277/96.1 |

OTHER PUBLICATIONS

"The Static and Dynamic Characteristics of the Spiral-Grooved Thrust Bearing", Malanoski et al., Journal of Basic Engineering, Sep. 1987, pp. 547-558.

*Primary Examiner*—William A. Cuchlinski, Jr.
*Assistant Examiner*—Scott W. Cummings
*Attorney, Agent, or Firm*—Wenderoth, Lind & Ponack

[57] ABSTRACT

A spiral groove face seal has a stationary sealing ring and a rotating sealing ring with opposed radially extending sealing surfaces for restricting fluid flow from a high pressure fluid side to a low pressure fluid side. The rotating sealing ring is in contact with the stationary sealing ring at at least a part of the sealing surfaces when the rotating ring is stopped, and the rotating ring is moved out of contact with the stationary sealing ring when the rotating sealing ring is rotated. The spiral groove face seal comprises spiral grooves formed on one of the sealing surfaces and extending from one circumference of the sealing surface in a radial direction and from the high pressure fluid side to the low pressure fluid side so as to pump fluid from the high pressure fluid side towards the low pressure fluid side. A recess is formed on one of the sealing surfaces coincident with or opposite to at least a portion of the area in which the spiral grooves are formed.

22 Claims, 11 Drawing Sheets

SPIRAL GROOVE FACE SEAL

BACKGROUND OF THE INVENTION

The present invention relates to a spiral groove face seal, and more particularly to a spiral groove face seal in which an end face of a rotating sealing ring rotatable with a rotating shaft, and an end face of a stationary sealing ring facing the rotating sealing ring, form sealing surfaces for restricting fluid flow from a high pressure side to a low pressure side.

In general, a spiral groove face seal is used for sealing the space between a rotating shaft and a housing thereof. The spiral groove face seal is incorporated in, for example, gas turbines or compressors which generate high pressure.

Conventionally, an end face seal comprises two annular sealing rings facing each other, one of which includes a spiral groove area having a plurality of spiral grooves and a dam area extending from the spiral groove area and having a flat surface, and the other of which has a flat surface.

The end face seal of this type is disclosed in, for example, U.S. Pat. No. 4,212,475. In U.S. Pat. No. 4,212,475 spiral grooves are formed on a rotating sealing ring as shown in FIGS. 13 through 15. In FIGS. 13 through 15, a rotating shaft 1 accommodated in a housing 9 is provided with a sleeve 2. The sleeve 2 is connected to a rotating sealing ring 3 through a pin. A stationary sealing ring 4 is pressed against the rotating sealing ring 3 by the urging forces of springs 10 interposed between a sealing ring retainer 5 and a spring retainer 6. The rotating sealing ring 3 includes a spiral groove area 35 having a plurality of spiral grooves 33 and a dam area 34 extending from the spiral groove area 35 and having a flat surface. The spiral grooves 33 serve to pump fluid (gas) inwardly, and the dam area 34 serves to restrict fluid flow pumped by the spiral grooves 33.

Relative motion of the rotating sealing ring 3 and the stationary sealing ring 4 is caused by rotating the rotating shaft 1. Under dynamic conditions, the end face seal will be exposed to hydrostatic forces from fluid pressure and hydrodynamic forces from the spiral grooves 33. The spiral groove pattern pumps fluid (gas) inwardly to thereby form a fluid film on the sealing surfaces, whereby the rotating sealing ring 3 is brought out of contact with the stationary sealing ring 4. The leakage of fluid is restricted by keeping the gap between the sealing surfaces small.

On the other hand, another type of end face seal is disclosed in U.S. Pat. No. 3,499,653. In U.S. Pat. No. 3,499,653 the end face seal comprises a rotating sealing ring and a stationary sealing ring, as with the end face seal in FIGS. 13 through 15. One of the sealing rings has spiral grooves and a tapered surface to provide the necessary wedge-shaped space at the radially outer regions thereof.

In the end face seal of this type, when fluid enters into the wedge-shaped space between the rotating sealing ring and the stationary sealing ring, the sealing surfaces are forced out of contact by hydrostatic forces from fluid pressure. When the fluid is under low pressure, the sealing surfaces are not forced out of contact by only hydrostatic forces, but are also forced out of contact by hydrodynamic forces from the spiral grooves in addition to the hydrostatic forces.

However, in the end face seal disclosed in U.S. Pat. No. 4,212,475, a ridge portion (on which spiral grooves are not formed) on the spiral groove area 35 is located on the same plane as the dam area 34 as shown in FIGS. 13 through 15. Therefore, when starting the end face seal, the ridge portion and the dam area 34 of the rotating sealing ring 3 directly contact the surface of the stationary sealing ring 4. In this specification, this direct contact of two solid members is defined as "solid contact." As a result, fluid (gas) cannot enter between the contacting surfaces of the two sealing members, and a large quantity of starting torque is thus required due to a large quantity of sliding resistance when starting in such a state that fluid pressure is applied to the sealing rings. The same is true in the stationary sealing ring having spiral grooves.

On the other hand, the end face seal disclosed in U.S. Pat. No. 3,499,653 is a gap type hydrostatic mechanical seal so that the sealing surfaces are forced out of contact by hydrostatic forces from fluid pressure. Therefore, there is no problem in starting resistance at the time of starting. However, since the sealing surfaces are forced out of contact by hydrostatic forces of the fluid, fluid is leaked from the sealing surfaces having a certain gap when the machine incorporating the seal face is stopped.

SUMMARY OF THE INVENTION

It is therefore an object of the present invention to provide a spiral groove face seal which can lower starting torque by reducing starting resistance when starting the machine, and prevent fluid from leaking from a high pressure side to a low pressure side when the machine is stopped.

According to the present invention, there is provided a spiral groove face seal having a stationary sealing ring and a rotating sealing ring with opposed radially extending sealing surfaces, the rotating sealing ring being in contact with the stationary sealing ring at at least a part of the sealing surfaces when the rotating sealing ring is stopped, the rotating ring being brought out of contact with the stationary sealing ring when the rotating sealing ring is rotated, the improvement comprising: spiral grooves formed in one of the sealing surfaces and extending from one circumference of the sealing surface in a radial direction and from a high pressure fluid side to a low pressure fluid side so as to pump fluid in the high pressure fluid side towards the low pressure fluid side; and a recess formed in one of the sealing surfaces, the recess being located in an area of the spiral grooves or a part of the spiral grooves.

With the above structure, fluid can enter into the sealing surfaces through the recess in such a state that the rotating sealing ring is in contact with the stationary sealing ring at at least a part of the sealing surfaces, the starting resistance can be remarkably reduced and the starting torque required to start the machine is reduced under high pressure, thus meeting the need to save energy. In the case where the depth of the recess is large, there is a possibility that pumping action generated by the spiral grooves will be affected by the recess to thereby impair the noncontacting function. However, adverse influences on pumping action are not caused because the depth of the recess is not large. The depth of the recess is preferably not more than 3 μm in consideration of surface roughness caused by working and unevenness of surface the. Further, according to the present invention, since the rotating sealing ring contacts the stationary sealing ring at a part of the sealing surfaces (the dam area), leakage of fluid from the high pressure side to the low pressure side can be prevented when the machine is stopped.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

A spiral groove face seal of the present invention will be described below with reference to FIGS. 1 through 8.

Figure 1:
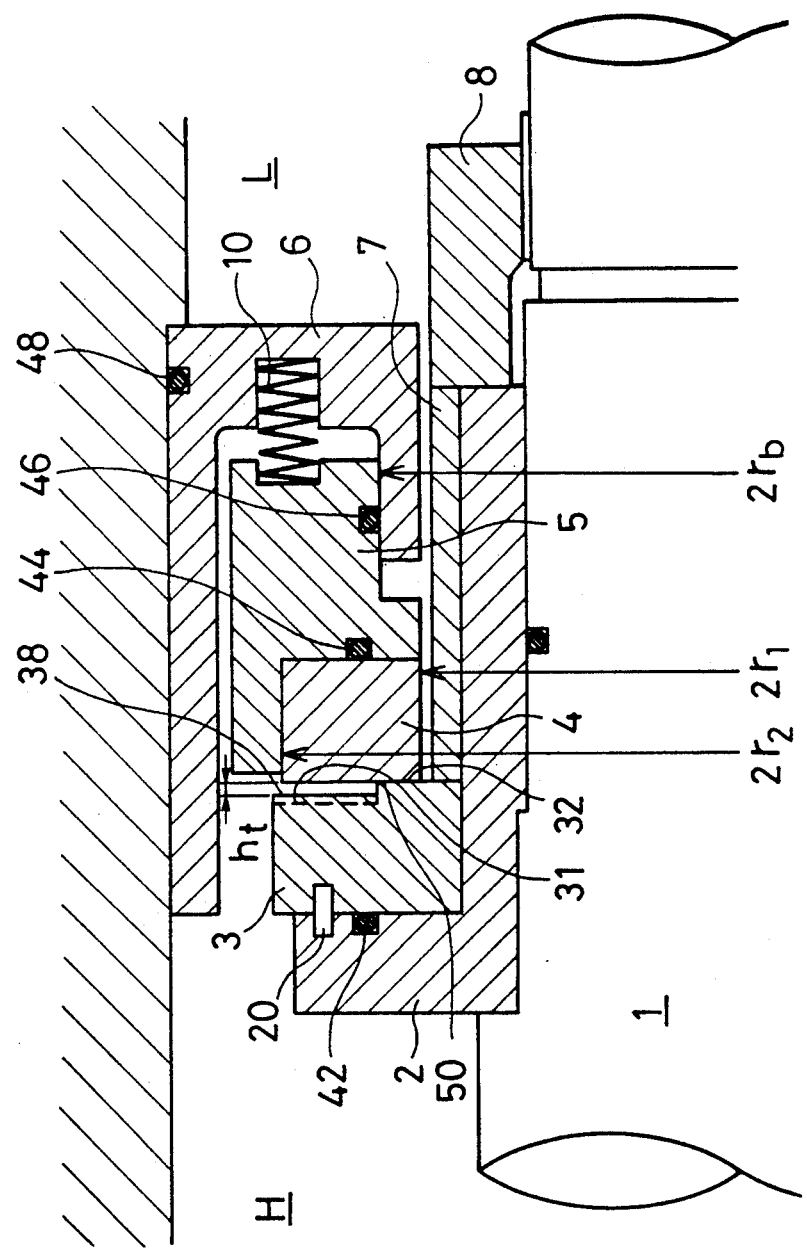
FIG. 1 is a cross-sectional view showing a spiral groove face seal according to a first embodiment of the present invention.

In FIG. 1, a sleeve 2 is fixedly secured to a rotating shaft 1 accommodated in a housing 9. A rotating sealing ring 3 is connected to the sleeve 2 through a pin 20. The rotating sealing ring 3 faces a stationary ring 4, and when starting, the rotating sealing ring 3 contacts the stationary ring 4 at a dam area 32 in a state of solid contact. The rotating sealing ring 3 comprises an annular body defining annular surfaces on the opposite sides thereof. Incidentally, the rotating sealing ring 3 is fixedly secured to the sleeve 2 by a sleeve 7 and a retaining nut 8.

Figure 2:
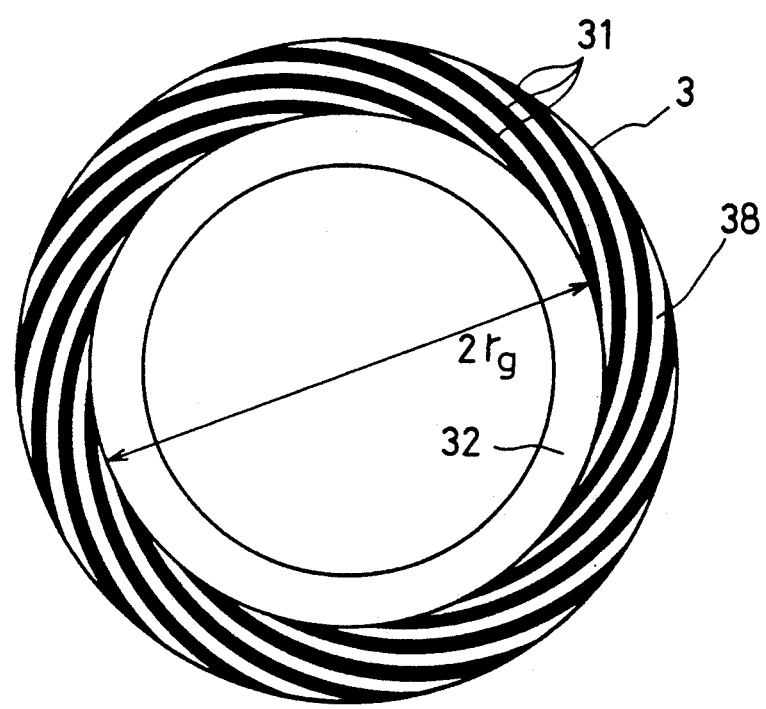
FIG. 2 is an end view showing spiral grooves formed on a rotating sealing ring of the spiral groove face seal according to the first embodiment of the present invention.

A stationary sealing ring 4 is pressed against the rotating sealing ring 3 by urging force of coiled springs 10 interposed between a sealing ring retainer 5 and a spring retainer 6. The rotating sealing ring 3 includes a spiral groove area 38 having a plurality of spiral grooves 31 which are directed from the high pressure fluid side H to the low pressure fluid side L as shown in FIG. 2. The rotating sealing ring 3 also has the area 32 extending from the spiral groove area 38.

Figure 3:
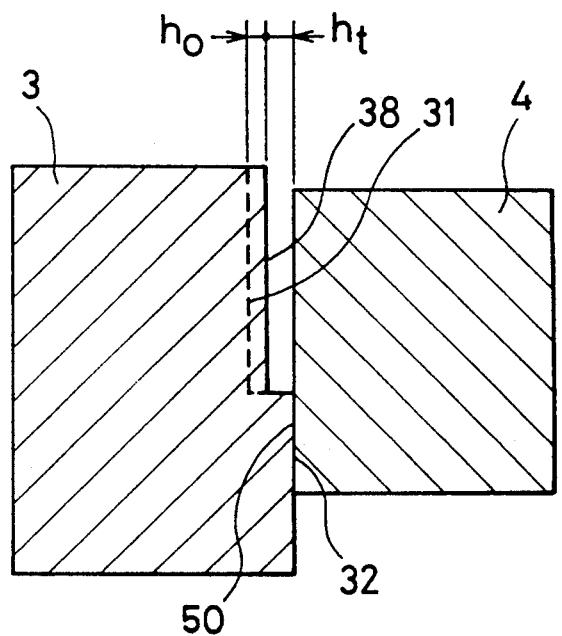
FIG. 3 is an enlarged cross-sectional view showing the rotating sealing ring and a stationary sealing ring of the spiral groove face seal according to the first embodiment of the present invention.

FIG. 3 is an enlarged cross-sectional view showing the rotating sealing ring 3 and the stationary sealing ring 4. The rotating sealing ring 3 is provided with an annular recess in the spiral groove area 38. The height of the ridge portion of the spiral groove area 38 is lower than that of the dam area 32 by the recess $h_t$. That is, there is provided a gap between the ridge portion of the spiral groove area 38 of the rotating sealing ring 3 and the surface of the stationary sealing ring 4 when the machine is stopped. Reference numerals 42, 44, 46 and 48 are sealing members such as O-rings in FIG. 1. With the above structure, the face seal prevents fluid having high pressure at the high pressure fluid side H from leaking out towards the low pressure fluid side L to the utmost extent.

Figure 4:
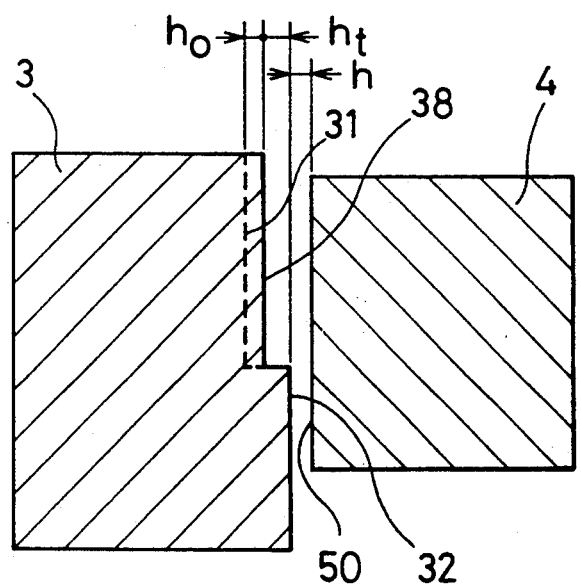
FIG. 4 is a cross-sectional view showing an operation of the spiral groove face seal according to the first embodiment of the present invention.

Next, the operation of the spiral groove face seal thus constructed will be described below with reference to FIG. 4.

Relative motion of the rotating sealing ring 3 and the stationary sealing ring 4 is caused by rotating the rotating shaft 1. Under dynamic conditions, the face seal will be exposed to hydrostatic forces from fluid pressure and hydrodynamic forces from the spiral grooves. The spiral groove pattern pumps fluid (gas) inward to thereby form a fluid film between the sealing surfaces. As a result, the rotating sealing ring 3 is moved out of contact with the stationary sealing ring 4, thus forming the gap h between the sealing surfaces of the rotating sealing ring 3 and the stationary sealing ring 4. That is, the dam area 32 of the rotating sealing ring 3 is moved out of contact with the surface 50 of the stationary sealing ring 4. The leakage of fluid is restricted by keeping the gap h between the two sealing surfaces small.

In the conventional end face seal, since reduction of the starting torque is not considered, the recess is not provided ($h_t = 0$ μm). Fluid pressure at the high pressure side H is represented by $P_2$, and fluid pressure at the low pressure side L is represented by $P_1$. It is assumed that fluid does not enter between the sealing surfaces which are in solid contact (contacting portion of the surface 32 and the surface 50 at the dam area) from the surroundings. The width of the spiral groove is equal to the width of the ridge. In other words, the area of the ridge portion is equal to that of the spiral grooves.

Figure 13:
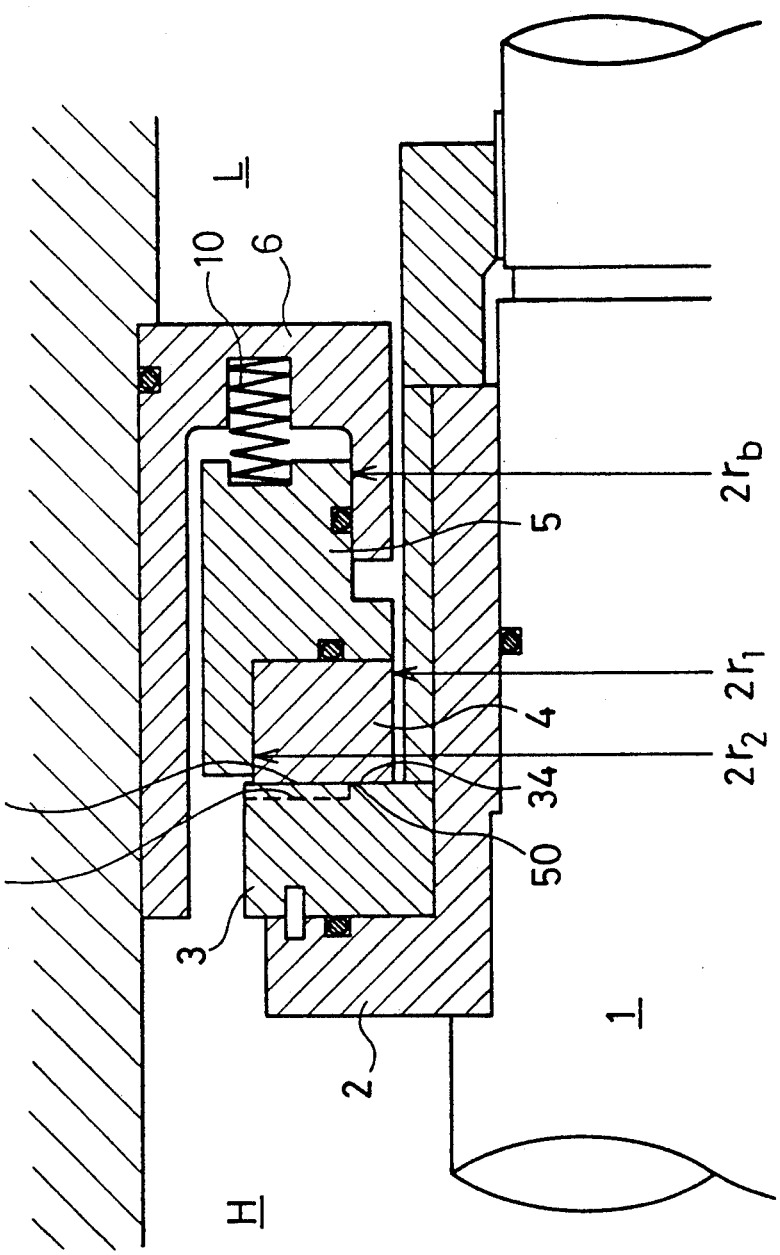
FIG. 13 is a cross-sectional view showing a conventional spiral groove face seal.
Figure 14:
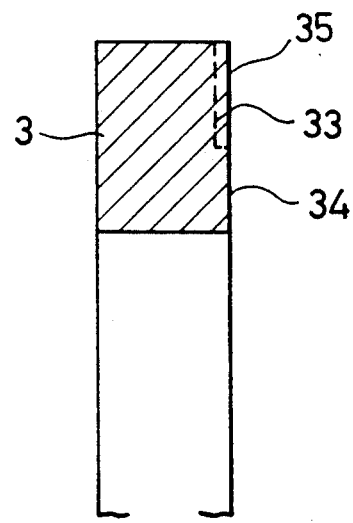
FIG. 14 is a cross-sectional view showing a rotating sealing ring of the conventional spiral groove face seal.
Figure 15:
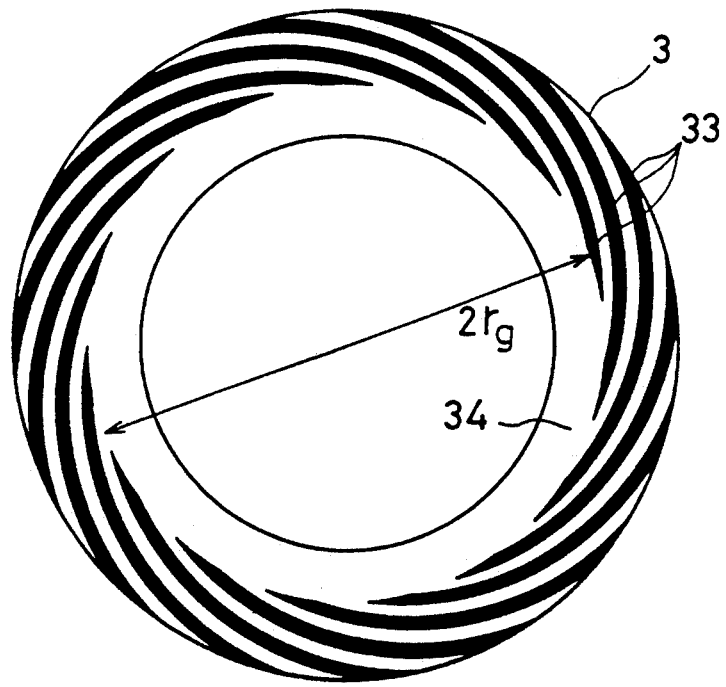
FIG. 15 is an end view showing spiral grooves of the conventional spiral groove face seal.

In the conventional end face seal in FIGS. 13 through 15, the load applied to the solid contact portion of the sealing surfaces is expressed by the following formula $$F = \pi(r_g^2 - r_b^2)P_2 + \pi(r_b^2 - r_1^2)P_1 + F_{sp} + \pi(r_2^2 - r_g^2)P_2/2 \quad (1)$$

where $F_{sp}$ is the urging force generated by the coiled springs 10.

On the other hand, in the end face seal of the present invention in FIGS. 1 and 2, the load applied to the solid contact portion of the sealing surfaces is expressed by the following formula.

$$F = \pi(r_g^2 - r_b^2)P_2 + \pi(r_b^2 - r_1^2)P_1 + F_{sp} \qquad (2).$$

According to the present invention, the load applied to the solid contact portion of the sealing surfaces is reduced by $\pi(r_2^2 - r_g^2)P_2/2$. The starting resistance is decreased by the quantity corresponding to the reduced load when starting the machine.

In the case where the recess $h_t$ is large, pumping action by the spiral grooves is decreased. Therefore, because there is a possibility that the function of avoiding the solid contact between the sealing surfaces would be impaired, it is desirable to make the recess $h_t$ small. Taking into consideration the unevenness of the surface condition of the sealing ring caused by working such as lapping (not more than 1 μm) or deformation caused by heat or pressure, it is desirable to make the recess $h_t$ small so that high pressure fluid can sufficiently enter into the recess. That is, a recess of not more than 3 μm is preferably selected.

The end face seal of the present invention is provided with the recess $h_t$ unlike the conventional end face seal for the purpose of reducing the starting resistance. The end face seal includes a sealing ring which has a step on the surface extending radially outwardly. That is, the sealing ring has two surfaces, one of which is formed with spiral grooves on the spiral groove area to create pumping action to pump fluid from the high pressure side to the low pressure side, the other of which has a flat surface on the dam area for restricting the fluid flow from the high pressure side to the low pressure side and performing a sealing function. In other words, the sealing ring has the spiral groove area to provide pumping action and the dam area to provide a sealing function.

As mentioned above, the end face seal of the present invention is provided with the recess $h_t$ for the purpose of reducing the starting resistance. As a result, the gap and film stiffness are lowered compared with the conventional spiral groove face seal. Therefore, the groove depth ($h_o$), the balance ($BR = (r_2^2 - r_b^2)/(r_2^2 - r_1^2)$) and the dam width ratio ($DW = (r_g - r_1)/(r_2 - r_1)$) must be properly chosen to maintain a narrow gap between the two surfaces of the sealing rings without causing solid contact due to various disturbance such as vibrations in an axial direction of the sealing surfaces, vibrations in an inclined direction relative to the axis, or deformation.

Next, characteristics of the end face seal of the present invention are shown in FIGS. 5 through 8 under conditions shown in table 1.

TABLE 1

| | |
|---|---|
| inside diameter of the sealing surface ($2r_1$ mm) | 138 |
| outside diameter of the sealing surface ($2r_2$ mm) | 180 |
| balance diameter ($2r_b$ mm) | 142.9 |
| spiral groove angle (α degree) | 15 |
| pressure at low pressure side ($P_1$ kgf/cm$^2$) | 1 |
| pressure at high pressure side ($P_2$ kgf/cm$^2$) | 31 |
| temperature of fluid at the sealing surfaces (C.) | 30 |
| rotational speed (N/min) | 13000 |
| fluid (gas) | air |

Note: the spiral groove angle is defined as an angle between a velocity vector at a point of the spiral groove and a tangent of the point of the spiral groove.

Figure 5:
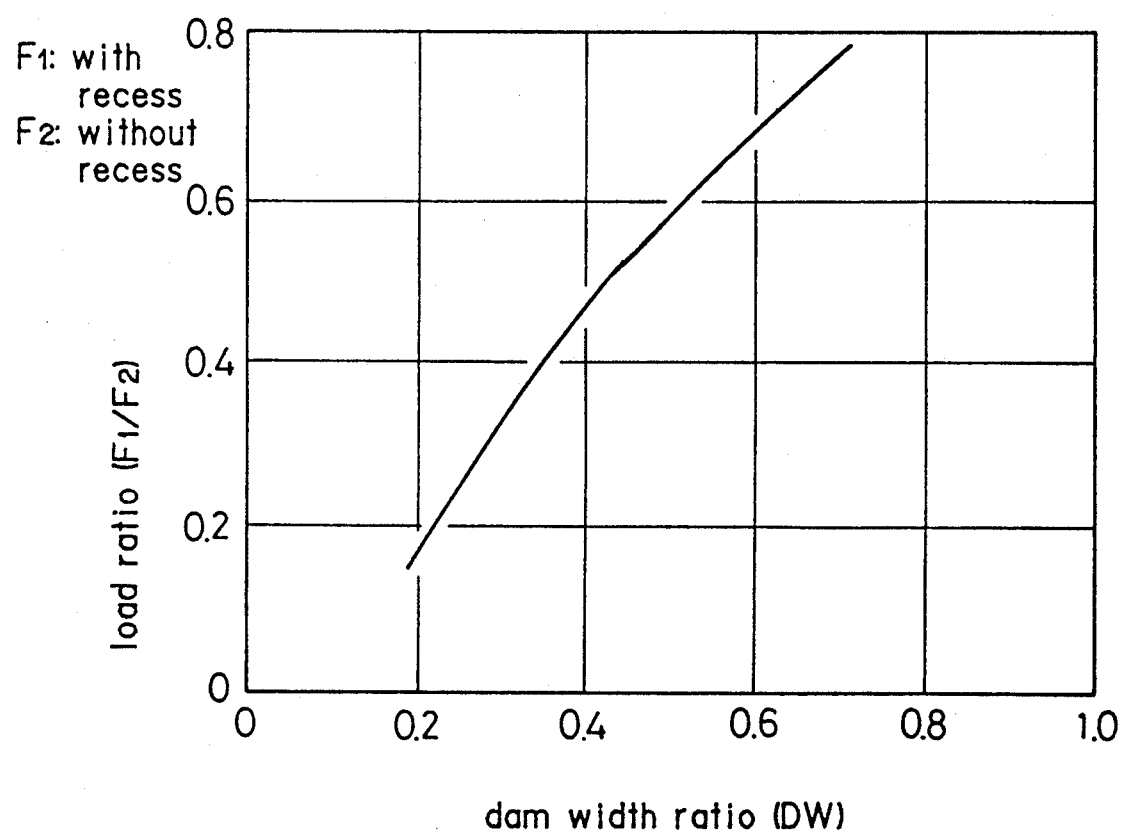
FIG. 5 is a graph showing the relationship of the dam width ratio (DW) and the load ratio ($F_1/F_2$) of the end face seal having a recess $h_t$ relative to the end face seal having no recess.

FIG. 5 shows the effect of reducing the load of the sealing surfaces by forming the recess $h_t$. In FIG. 5, the horizontal axis represents the dam width ratio (DW), and the vertical axis represents the load ratio ($F_1/F_2$) of the end face seal having the recess $h_t$ relative to the end face seal having no recess, wherein the former ($F_1$) is obtained using the formula (2) and the latter ($F_2$) is obtained using the formula (1).

As is apparent from FIG. 5, the smaller the dam width ratio is formed, the smaller the load ratio becomes. Assuming that coefficients of friction at all points on the sealing surfaces are the same, the starting resistance can be greatly reduced by forming the recess $h_t$.

Figure 6:
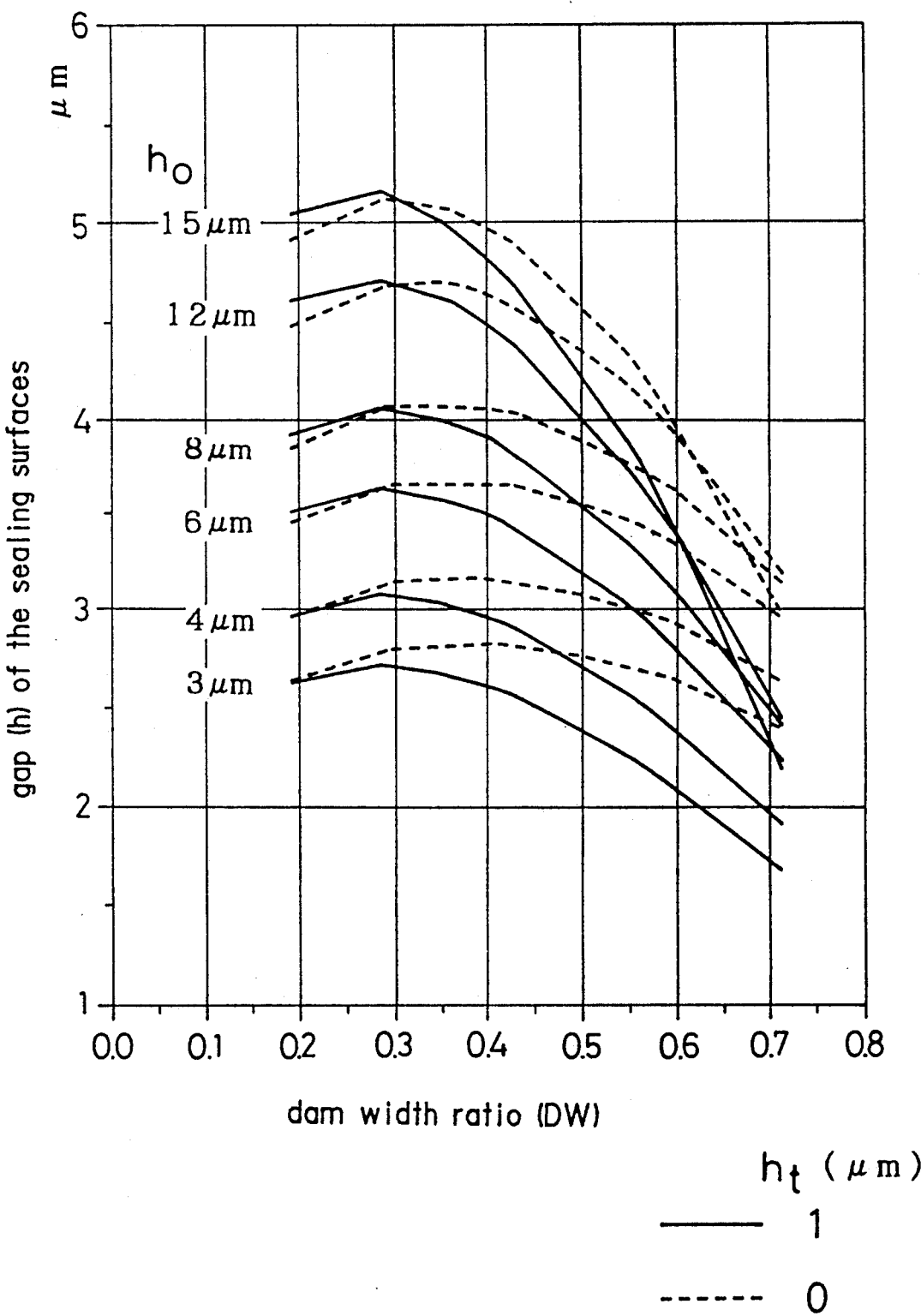
FIG. 6 is a graph showing the relationship between the dam width ratio (DW) and the gap (h) of the sealing surfaces of the end face seal.
Figure 7:
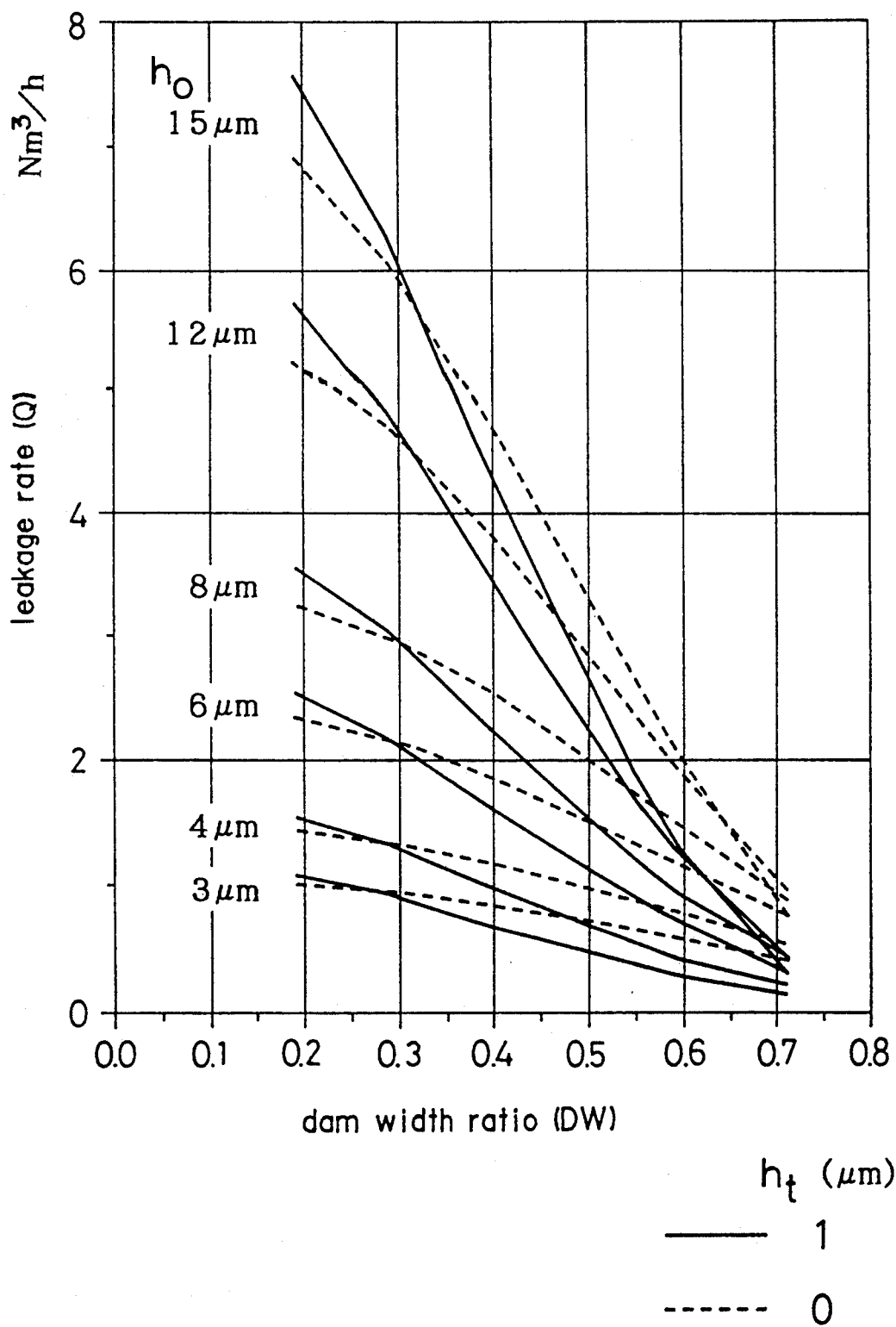
FIG. 7 is a graph showing the relationship between the dam width ratio (DW) and the leakage rate (Q) of the end face seal.
Figure 8:
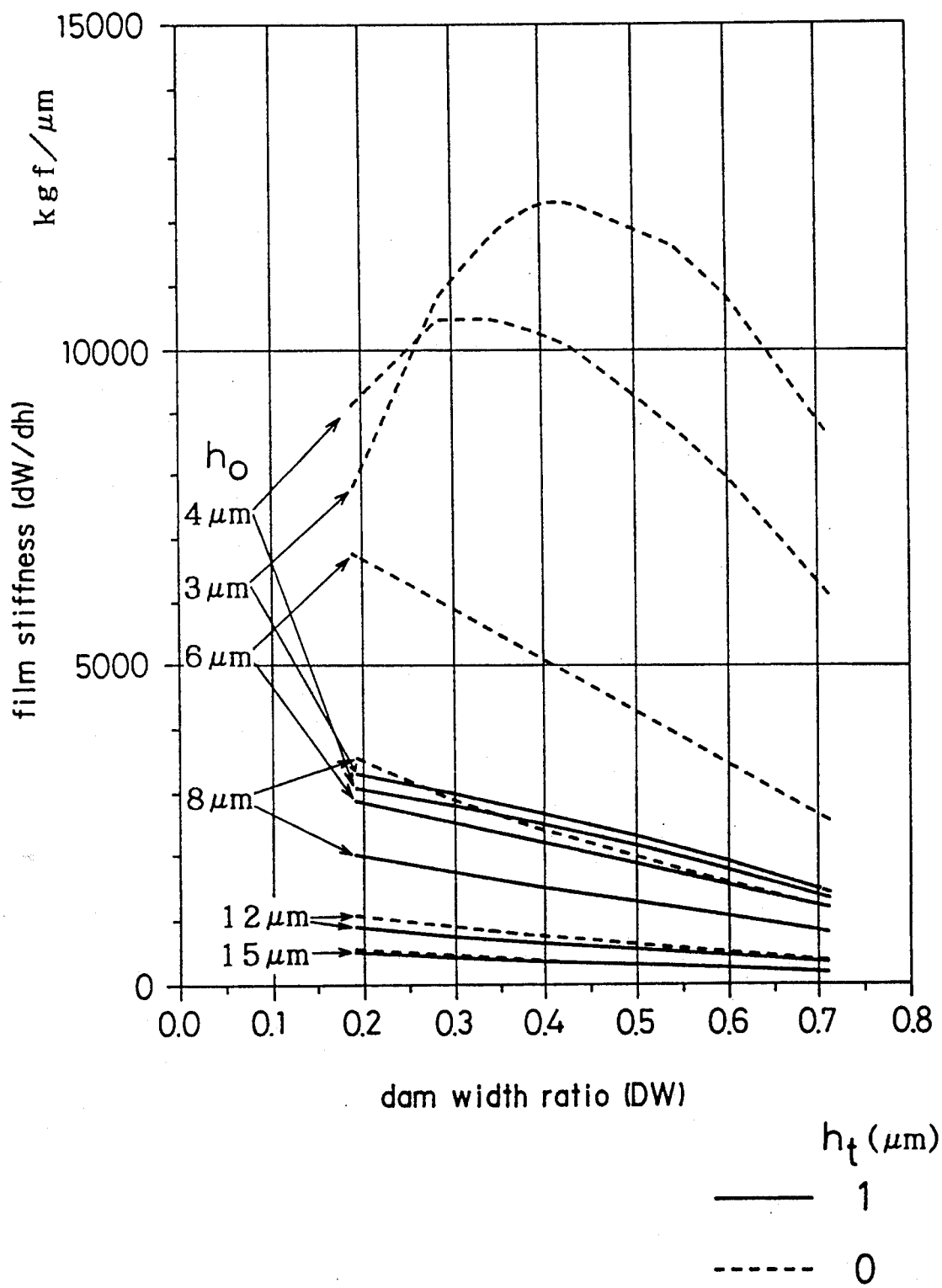
FIG. 8 is a graph showing the relationship between the dam width ratio (DW) and the film stiffness (dW/dh)

Further, when the balance is constant (BR = 0.897), and the dam width ratio (DW) and the groove depth ($h_o$) are variable, the gap of the sealing surface (h), the leakage rate (Q) and the film stiffness (dW/dh) having 1 μm in thickness are shown in FIGS. 6 through 8. When calculating the film stiffness (dW/dh), the gap between the sealing surfaces is chosen to be 1 μm because there is a fair chance that the solid contact will occur.

In FIGS. 6 through 8, the sealing surfaces having the recess are represented by solid lines, and the sealing surfaces having no recess are represented by broken lines. The film stiffness is remarkably decreased by forming the recess $h_t$, as shown in FIG. 8. The film stiffness is especially decreased, when the groove depth ($h_o$) is shallow. On the other hand, the gap between the sealing surfaces (h) and the leakage rate (Q) are not affected much by the recess when the dam width ratio is relatively small, in a range of 0.3 or thereabout.

Next, in the end face seal of the present invention, a process of determining a preferred range of the groove depth ($h_o$), the dam width ratio (DW) and the balance (BR) will be described below on the basis of the results shown in FIGS. 5 through 8.

In the end face seal of the present invention, the starting resistance can be greatly reduced by forming the recess as shown in FIG. 5. However, this will result in the film stiffness being reduced as shown in FIG. 8. The decrease in the film stiffness is disadvantageous because it tends to cause solid contact and to prevent normal operation. Therefore, the film stiffness must be improved. The groove depth ($h_o$) and the dam width ratio (DW) are closely related to the film stiffness among the above three factors as shown in FIG. 8. To be more specific, when the groove depth $h_o$ is reduced, the film stiffness is raised. On the contrary, when the groove depth $h_o$ is reduced, the gap between the sealing surfaces is reduced as shown in FIG. 6 and the leakage rate is reduced as shown in FIG. 7. However, when the gap between the sealing surfaces is made too small, there is a possibility that solid contact will occur between the sealing surfaces. Therefore, an extremely small groove depth $h_o$ cannot be chosen. Further, an extremely small value should also not be chosen for the groove depth $h_o$ due to the possibility of working error. Accordingly, in the end face seal of the present invention, the lower limit of the groove depth $h_o$ is preferably 3 μm. On the contrary, the upper limit of the groove depth is expanded up to 15 μm in consideration of a rough sealing effect which is applicable to a relatively low pressure fluid.

Next, the relationship between the dam width ratio and the film stiffness will be explained below. When the dam width ratio is reduced, the film stiffness is increased as shown in FIG. 8. Therefore, as far as the film stiffness is concerned, it is desirable to make the dam width ratio small. On the other hand, when the dam width ratio is decreased, the leakage rate increases as shown in FIG. 7. Further, in the case where the dam width ratio is extremely small and there are flaws or chips on the sealing ring at the dam area 32, the end face seal does not function as a due to leakage of fluid therefrom. Accordingly, in the end face seal of the present invention, the lower limit of the dam width ratio is preferably 0.2. The upper limit of the dam width ratio is preferably 0.4 so that the film stiffness does not become excessively small.

Concerning the balance, taking into consideration the fact that solid contact is maintained at the dam area of the sealing surfaces when the machine is stopped and leakage of fluid is minimized from the high pressure side to the low pressure side, it is desirable to select a balance of between 0.8 and 0.9.

As is apparent from the foregoing description, the preferable ranges of the groove depth ($h_o$), the dam width ratio ($DW=(r_g-r_1)/(r_2-r_1)$) and the balance ($BR=(r_2^2-r_b^2)/(r_2^2-r_1^2)$) are shown in table 2.

TABLE 2

| | |
|---|---|
| recess ($h_t$ μm) | not more than 3 |
| the groove depth ($h_0$ μm) | 3 to 15 |
| the dam width ratio (DW) | 0.2 to 0.4 |
| the balance (BR) | 0.8 to 0.9 |

Next, other embodiments of the present invention will be described below with reference to FIGS. 9 through 12. Those parts and components in FIGS. 9 through 12 which are structurally and functionally identical to those shown in FIGS. 1 through 4 are denoted using the same reference numerals.

Figure 9:
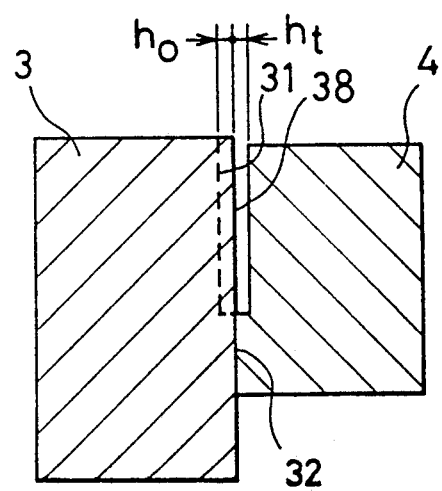
FIG. 9 is a cross-sectional view showing a spiral groove face seal according to a second embodiment of the present invention.

FIG. 9 is a cross-sectional view showing a spiral groove face seal according to a second embodiment of the present invention. According to this embodiment, the recess $h_t$ is provided on the stationary ring 4. The area where the recess $h_t$ is formed is the area of the stationary ring 4 opposite where the spiral groove area 38 is formed on the rotating sealing ring 2. The second embodiment has the same function and effect as the first embodiment shown in FIGS. 1 through 4.

Figure 10A:
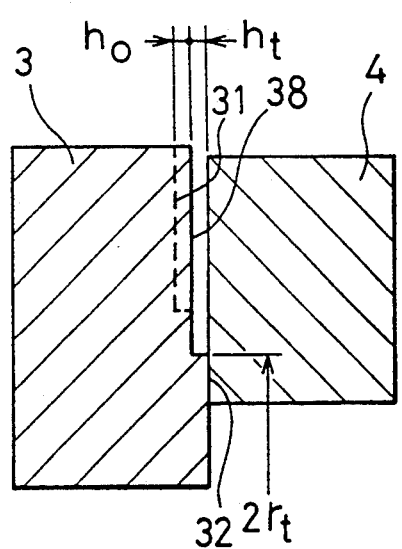
FIGS. 10(a) and 10(b) are cross-sectional views showing a spiral groove face seal according to a third embodiment of the present invention.
Figure 10B:
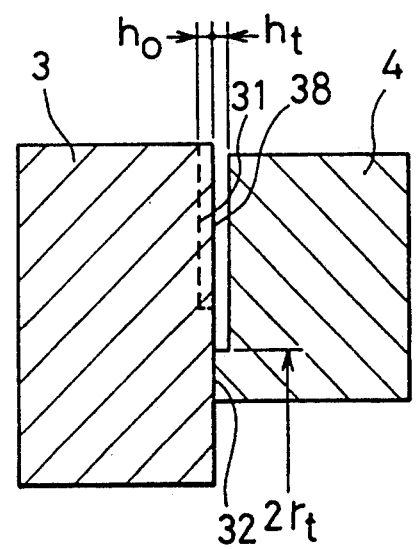

FIGS. 10(a) and 10(b) are cross-sectional views showing a spiral groove face seal according to a third embodiment of the present invention. According to this embodiment, the recess $h_t$ extends into the dam area 32. The recess $h_t$ is formed on the rotating sealing ring 3 in FIG. 10(a), and the recess $h_t$ is formed on the stationary sealing ring 4 in FIG. 10(b).

The load applied to the solid contact portion of the sealing surfaces is expressed by the following formula $$F=\pi(r_t^2-r_b^2)P_2+\pi(r_b^2-r_1^2)P_1+F_{sp}(r_t>r_b) \quad (3)$$

where $2r_t$ is the inside diameter of the recess $h_t$.

Therefore, the load of this embodiment is smaller than that of the first embodiment in FIGS. 1 through 4.

Figure 11A:
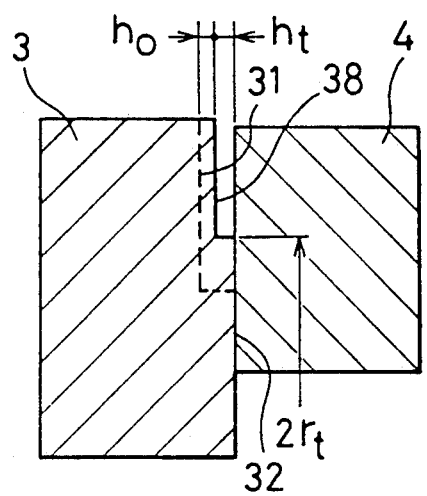
FIGS. 11(a) and 11(b) are cross-sectional views showing a spiral groove face seal according to a foruth embodiment of the present invention.
Figure 11B:
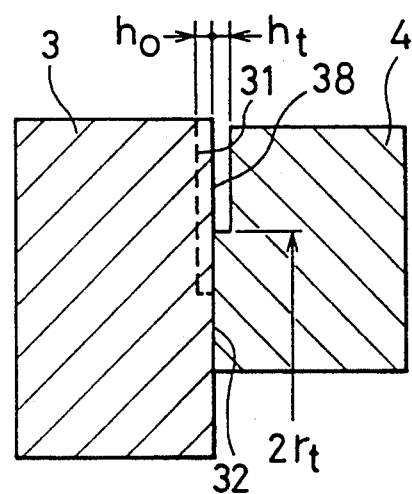
Figure 12:
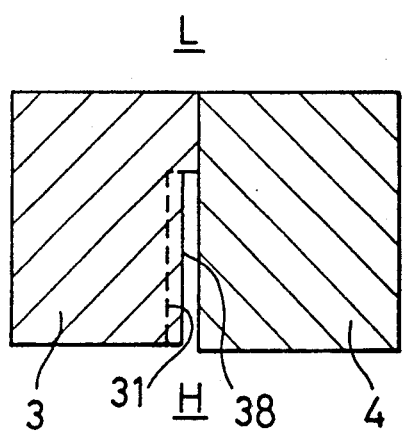
FIG. 12 is a cross-sectional view showing a spiral groove face seal according to a fifth embodiment of the present invention.

FIGS. 11(a) and 11(b) are cross-sectional views showing a spiral groove face seal according to a fourth embodiment of the present invention. According to this embodiment, the recess $h_t$ is located inside the spiral groove area 38 (i.e. the recess $h_t$ is not formed over the entire spiral groove area 38). The recess $h_t$ is formed on the rotating sealing ring 3 in FIG. 11(a), and the recess $h_t$ is formed on the stationary sealing ring 4 in FIG. 11(b).

The load applied to the solid contact portion of the sealing surfaces is expressed by the following formula.

$$F=\pi(r_g^2)P_2+\pi(R_b^2-r_1^2)P_1+F_{sp}+\pi(r_t^2-r_g^2)P_2/2 \quad (4)$$

where $2r_t$ is inside diameter of the recess $h_t$.

Therefore, the load of this embodiment is larger than that of the first embodiment shown in FIGS. 1 through 4.

In the embodiments shown in FIGS. 1 through 11, the radially outer portion of the spiral groove area is the high pressure side and the radially inner portion of the spiral groove is the low pressure side such that, the fluid flows inwardly at the sealing surfaces. On the contrary, in a fifth embodiment shown in FIG. 12, the radially outer portion of the spiral groove area is the low pressure side and the radially inner portion of the spiral groove area is the high pressure side such that, the fluid flows outwardly at the sealing surfaces. The fifth embodiment has the same function and effect as the embodiments shown in FIGS. 1 through 11.

As is apparent from the foregoing description, according to the spiral groove face seal of the present invention, since fluid can enter between the sealing surfaces through the recess in such a state that the rotating sealing ring is in contact with the stationary sealing ring at at least a part of the sealing surfaces, the starting resistance can be remarkably reduced and the starting torque required to start the machine is reduced under high pressure, thus avoiding failure in starting the machine and preventing the sealing surfaces from being damaged.

Further, according to the present invention, the recess is provided on one of the sealing rings, so that pumping action generated by the spiral grooves is affected by the recess. However, a desirable performance is obtained by selecting the range of the groove depth ($h_0$), the dam width ratio (DW) and the balance (BR), thereby preventing the noncontacting function of the sealing surfaces from being imparied.

Furthermore, according to the present invention, since the rotating sealing ring contacts the stationary sealing ring at the dam area, leakage of fluid from the high pressure side to the low pressure side can be prevented when the machine is stopped.

Although certain preferred embodiments have been shown and described, it should be understood that many changes and modifications may be made therein without departing from the scope of the appended claims.

What is claimed is:

1. In a spiral groove face seal having a stationary sealing ring and a rotating sealing ring with opposed radially extending sealing surfaces, said rotating sealing ring being in contact with said stationary sealing ring at at least a part of said sealing surfaces when said rotating ring is stopped, said rotating sealing ring being brought out of contact with said stationary sealing ring when said rotating sealing ring is rotated, the improvement comprising:

spiral grooves formed in a spiral groove area of one of said sealing surfaces and extending from one circumference of said one of said sealing surfaces in a radial direction; and a recess formed in one of said sealing surfaces, said recess being located in said spiral groove area and extending beyond said spiral groove area to a flat surface of an ungrooved area.

2. The spiral groove face seal according to claim 1, wherein said recess is formed on said sealing surface of said rotating sealing ring.

3. The spiral groove face seal according to claim 1, wherein said recess is formed on said sealing surface of said stationary sealing ring.

4. The spiral groove face seal according to claim 1, wherein said spiral grooves extend from an outside circumference toward a center of said one of said sealing surfaces in which said spiral grooves are formed.

5. The spiral groove face seal according to claim 1, wherein said spiral grooves extend from an inside circumference towards a center of said one of said sealing surfaces in which said spiral grooves are formed.

6. The spiral groove face seal according to claim 1, wherein said spiral grooves have a depth of between approximately 0.003 and 0.015 mm;

a sealing interface is defined by annular portions of said first and second sealing surfaces which directly face one another; and said face seal has a dam width ratio of between approximately 0.2 and 0.4 according to one of the following formulas Dam Width Ratio $=(r_g-r_1)/(r_2-r_1)$ Dam Width Ratio $=(r_2-r_g)/(r_2-r_1)$ where groove diameter $2r_g$ is the diameter of a circle defined by the boundary between said spiral groove area and an ungrooved area in said one of said first and second sealing surfaces in which spiral grooves are formed, $2r_1$ is an inside diameter of said sealing interface and $2r_2$ is an outside diameter of said sealing interface.

7. The spiral groove face seal according to claim 6, wherein said face seal has a balance of between 0.8 and 0.9 according to one of the following formulas Balance $=(r_2^2-r_b^2)/(r_2^2-r_1^2)$ Balance $=(r_b^2-r_1^2)/(r_2^2-r_1^2)$ where $2r_2$ is said outside diameter of said sealing interface, $2r_1$ is said inside diameter of said sealing interface and $2r_b$ is a balance diameter of said face seal.

8. The spiral groove face seal according to claim 2, wherein said recess has a depth of not more than 3 μm.

9. A rotating sealing ring comprising:

an annular body defining annular surfaces on the opposite sides thereof, said annular body having spiral grooves formed in a spiral groove area of one of said surfaces, said spiral grooves extending from a circumferential edge of said annular body in a radial direction, and said annular body having a recess formed in said one of said surfaces, said recess being located in said spiral groove area and extending beyond said spiral groove area to a flat surface of an ungrooved area.

10. The rotating sealing ring according to claim 9, wherein said recess has a depth of not less than 3 μm.

11. A spiral groove face seal for sealing against flow of fluid from a high pressure side to a low pressure side of said seal, comprising:

a stationary sealing ring having a first annular sealing surface;

a rotating sealing ring mounted rotatably relative to said stationary sealing ring and having a second annular sealing surface facing said first annular sealing surface;

wherein one of said first and second sealing surfaces has an annular spiral groove area with spiral grooves formed therein, said spiral grooves defining a means for pumping fluid from the high pressure side of said seal toward the low pressure side of said seal when said rotating seal ring is rotated;

wherein said one of said first and second sealing surfaces further has an annular dam area with no grooves formed therein, said annular dam area defining a means for blocking fluid pumped from the high pressure side toward the low pressure side by said pumping means before the fluid reaches the low pressure side of said seal;

wherein an annular recessed portion is formed in one of a portion of said annular spiral groove area of said one of said first and second sealing surfaces, and a portion of the other of said first and second sealing surfaces facing said annular spiral groove area of said one of said first and second sealing surfaces; and wherein a means is provided for causing respective portions of said first and second annular sealing surfaces to be in solid contact with one another when said rotating sealing ring is not rotating, and for allowing a gap to be formed between said respective portions of said first and second annular sealing surfaces so that a fluid film can be formed therebetween when said rotating sealing ring is rotated.

12. A spiral groove face seal as recited in claim 11, wherein said annular recessed portion extends radially beyond said spiral groove area to a flat surface having no grooves formed therein.

13. A spiral groove face seal as recited in claim 11, wherein said annular recessed portion is formed in said second sealing surface of said rotating sealing ring.

14. A spiral groove face seal as recited in claim 11, wherein said annular recessed portion is formed in said first sealing surface of said stationary sealing ring.

15. A spiral groove face seal as recited in claim 11, wherein said spiral groove area is formed adjacent an outer circumference of said one of said first and second sealing surfaces.

16. A spiral groove face seal as recited in claim 11, wherein said spiral groove area is formed adjacent an inner circumference of said one of said first and second sealing surfaces.

17. A spiral groove face seal as recited in claim 11, wherein said spiral grooves have a depth of between approximately 0.003 and 0.015 mm;

a sealing interface is defined by annular portions of said first and second sealing surfaces which directly face one another; and said face seal has a dam width ratio of between approximately 0.2 and 0.4 according to one of the following formulas $$\text{Dam Width Ratio} = (r_g - r_1)/(r_2 - r_1)$$

$$\text{Dam Width Ratio} = (r_2 - r_g)/(r_2 - r_1)$$

where groove diameter $2r_g$ is the diameter of a circle defined by the boundary between said spiral groove area and an ungrooved area in said one of said first and second sealing surfaces in which said spiral grooves are formed, $2r_1$ is an inside diameter of said sealing interface and $2r_2$ is an outside diameter of said sealing interface.

18. A spiral groove face seal as recited in claim 17, wherein said face seal has a balance of between 0.8 and 0.9 according to one of the following formulas $$\text{Balance} = (r_2^2 - r_b^2)/(r_2^2 - r_1^2)$$

$$\text{Balance} = (r_b^2 - r_1^2)/(r_2^2 - r_1^2)$$

where $2r_2$ is said outside diameter of said sealing interface, $2r_1$ is said inside diameter of said sealing interface and $2r_b$ is a balance diameter of said face seal.

19. A spiral groove face seal as recited in claim 11, wherein said annular recessed portion has a depth of not more than 3 μm.

20. A spiral groove face seal for sealing against flow of fluid from a high pressure side to a low pressure side of said seal, comprising:

a rotating sealing ring having an annular sealing surface;

wherein said annular sealing surface has an annular spiral groove area with spiral grooves formed therein, said spiral grooves defining a means for pumping fluid from the high pressure side of said seal toward the low pressure side of said seal when said rotating sealing ring is rotated;

wherein said annular sealing surface further has an annular dam area with no grooves formed therein, said annular dam area defining a means for blocking fluid pumped from the high pressure side toward the low pressure side by said pumping means before the fluid reaches the low pressure side of said seal; and wherein an annular recessed portion is formed in a portion of said annular spiral groove area.

21. A spiral groove face seal as recited in claim 20, wherein said annular recessed portion extends radially beyond said spiral groove area to a flat surface having no grooves formed therein.

22. A spiral groove face seal as recited in claim 20, wherein said annular recessed portion has a depth of not more than 3 μm.

* * * * *